F. L. WEBSTER.
BALE TIE MACHINE.
APPLICATION FILED APR. 23, 1910.

1,000,866.

Patented Aug. 15, 1911.
8 SHEETS—SHEET 1.

Witnesses
F. C. Gibson.
C. C. Hines.

Inventor
Frank L. Webster.
By Victor J. Evans
Attorney

COLUMBIA PLANOGRAPH CO., WASHINGTON, D. C.

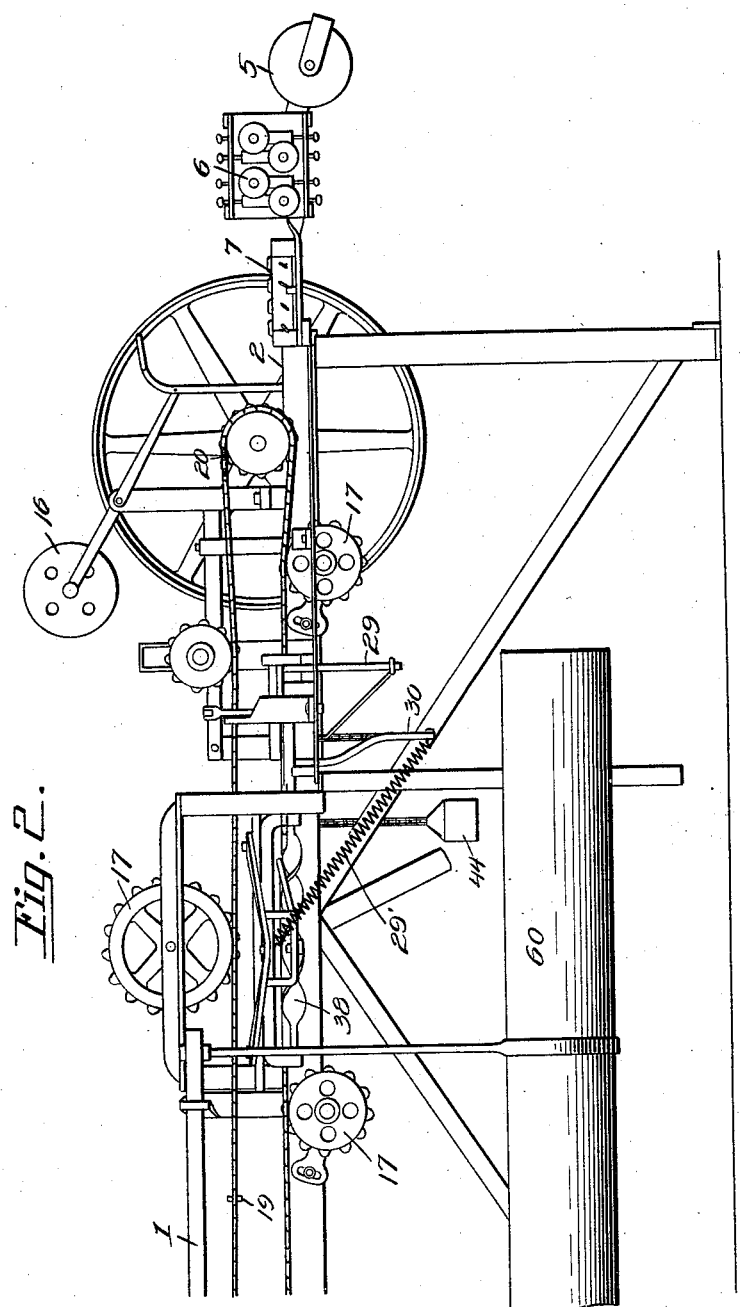

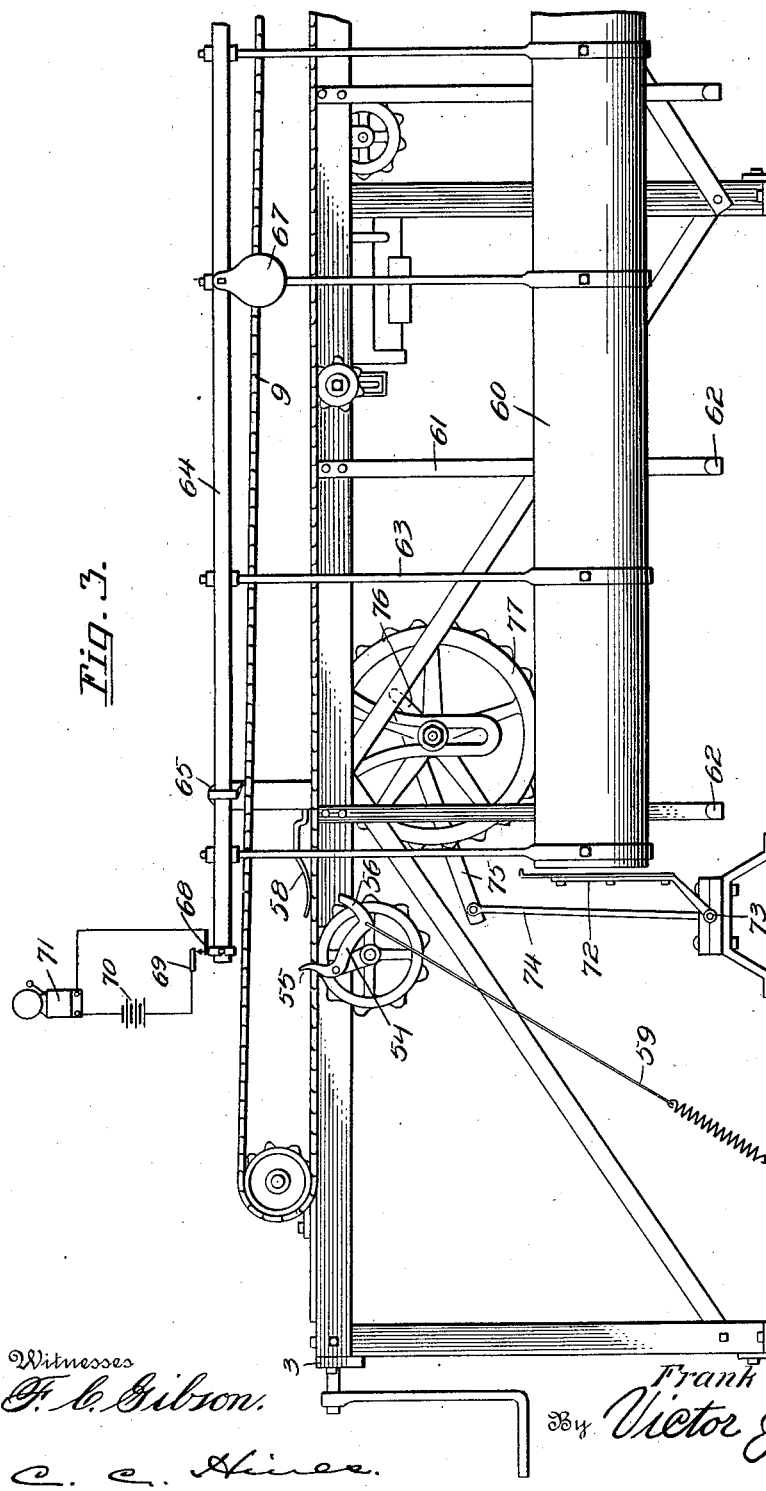

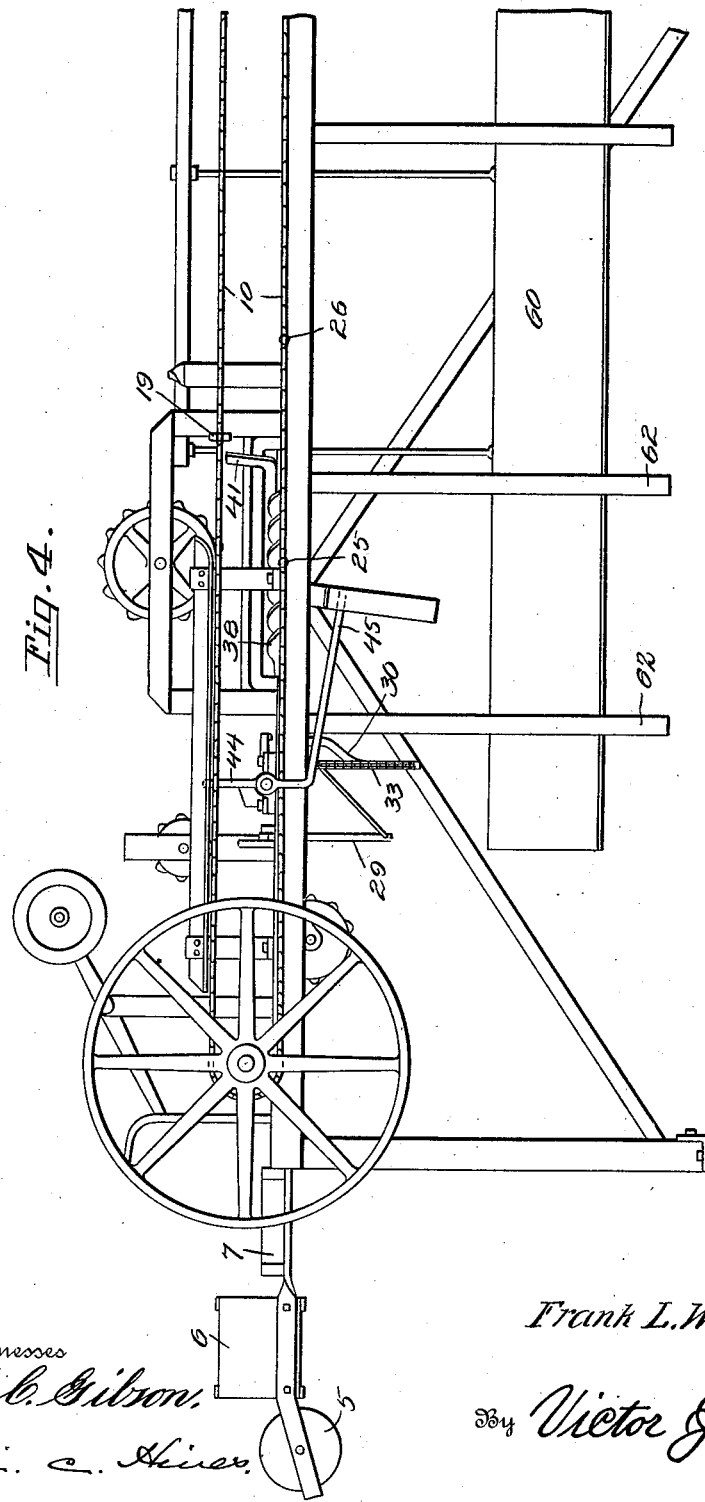

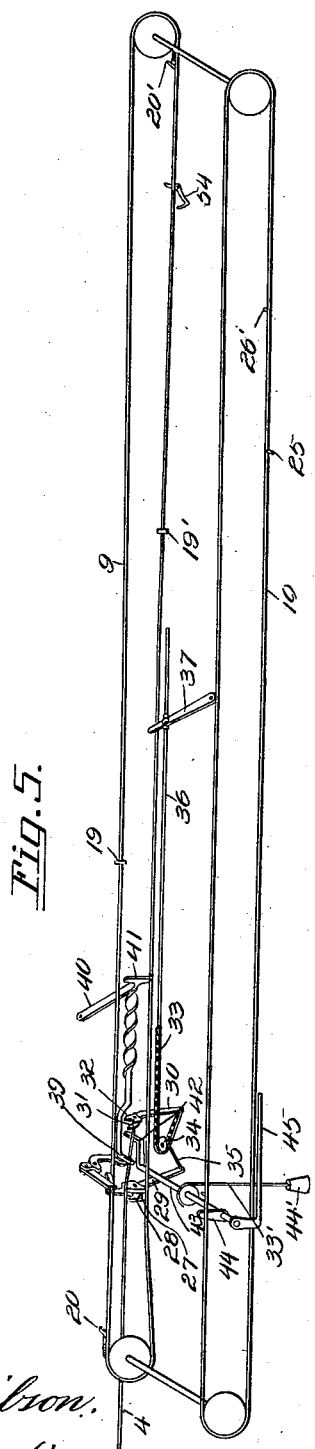

F. L. WEBSTER.
BALE TIE MACHINE.
APPLICATION FILED APR. 23, 1910.
1,000,866.
Patented Aug. 15, 1911.
8 SHEETS—SHEET 6.
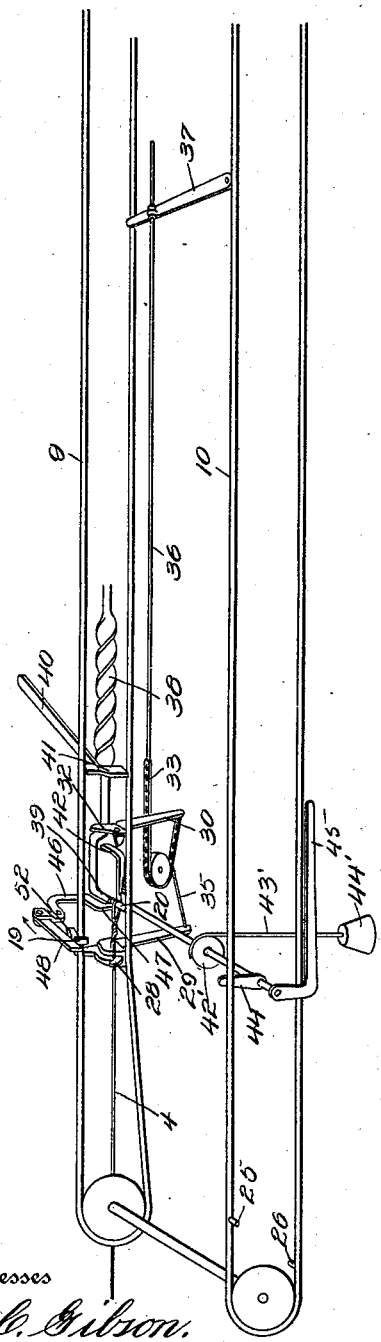
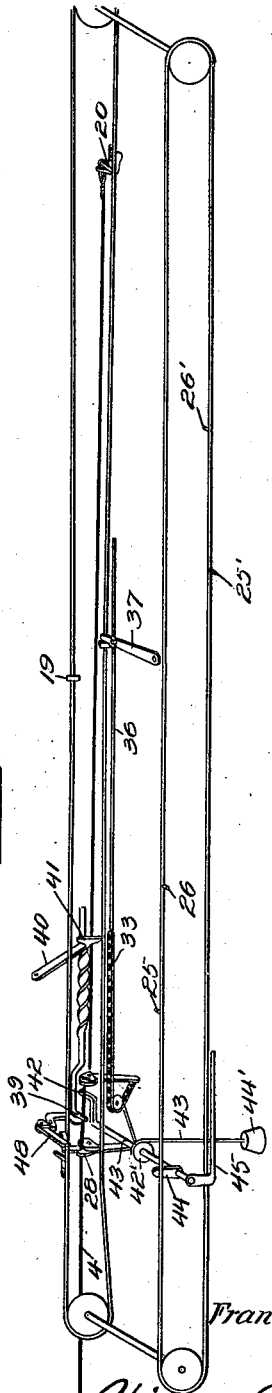
Inventor
Frank L. Webster
Witnesses
By Victor J. Evans
Attorney F. L. WEBSTER.
BALE TIE MACHINE.
APPLICATION FILED APR. 23, 1910.
1,000,866.
Patented Aug. 15, 1911.
8 SHEETS—SHEET 7.
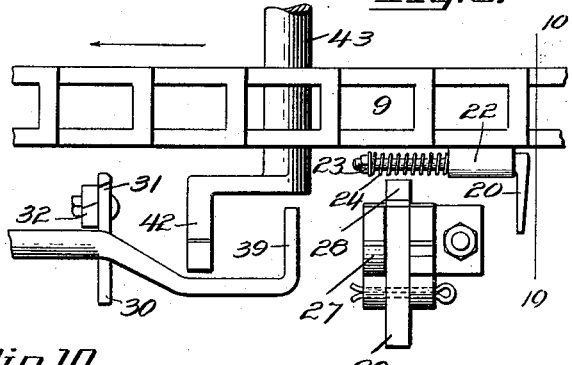
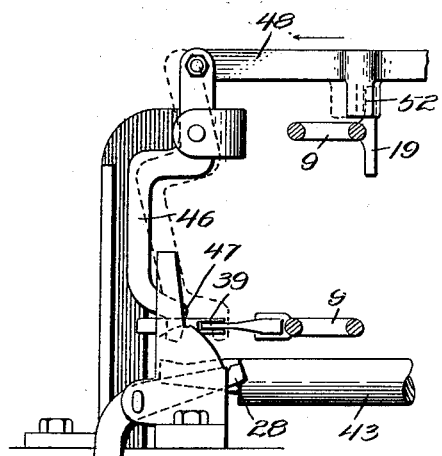
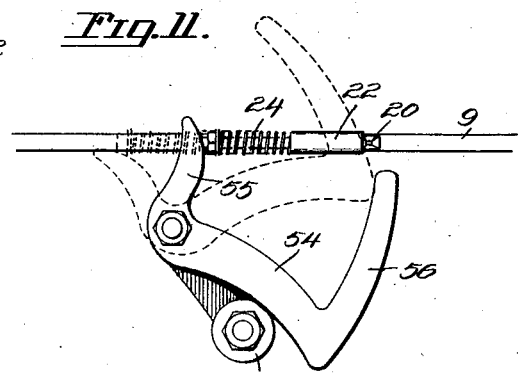
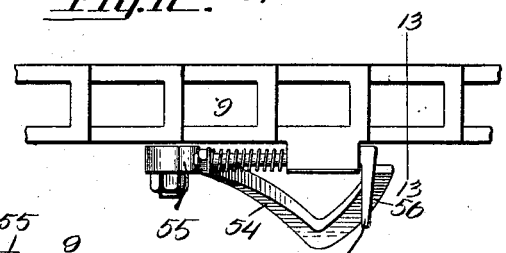
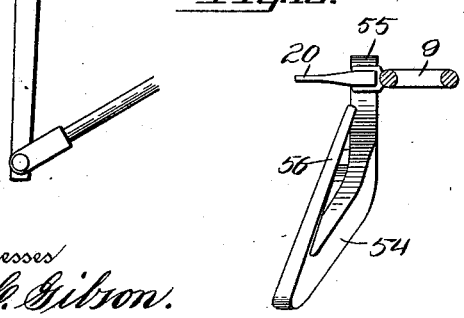
Witnesses
F. C. Gibson.
C. C. Hines.
Inventor
Frank L. Webster.
By Victor J. Evans
Attorney

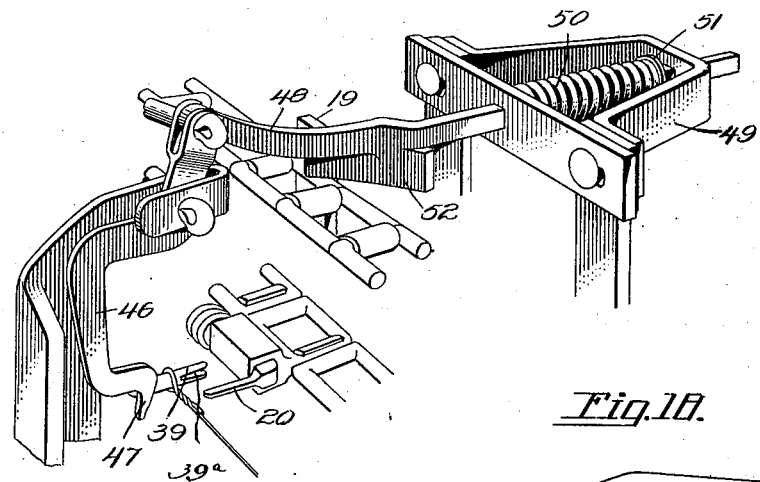
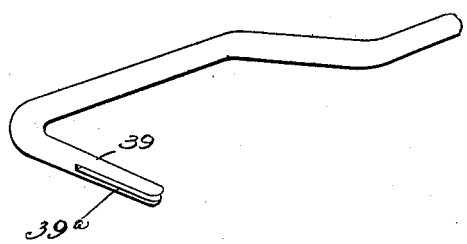
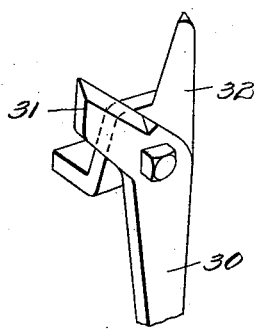
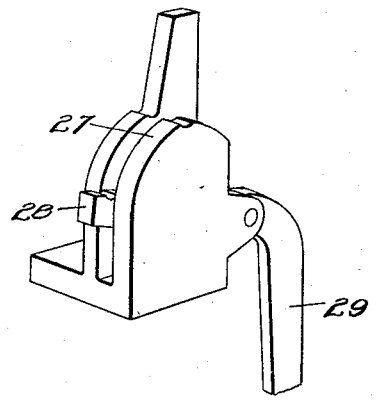

UNITED STATES PATENT OFFICE.

FRANK LENARD WEBSTER, OF CHEROKEE, KANSAS.

BALE-TIE MACHINE.

1,000,866. Specification of Letters Patent. Patented Aug. 15, 1911.

Application filed April 23, 1910. Serial No. 557,161.

*To all whom it may concern:*

Be it known that I, FRANK L. WEBSTER, a citizen of the United States, residing at Cherokee, in the county of Crawford and State of Kansas, have invented new and useful Improvements in Bale-Tie Machines, of which the following is a specification.

This invention relates to a machine for making wire bale ties of that character in which the tie is provided at one end with a loop for the passage of the other end of the tie therethrough.

The object of the invention is to provide a machine for rapidly and economically manufacturing bale ties of this character, and for disposing the formed ties so as to be packed into bundles, each containing a determined number of ties.

The invention consists of the features of construction, combination and arrangement of parts, hereinafter fully described and claimed, reference being had to the accompanying drawings, in which:—

Figure 1:
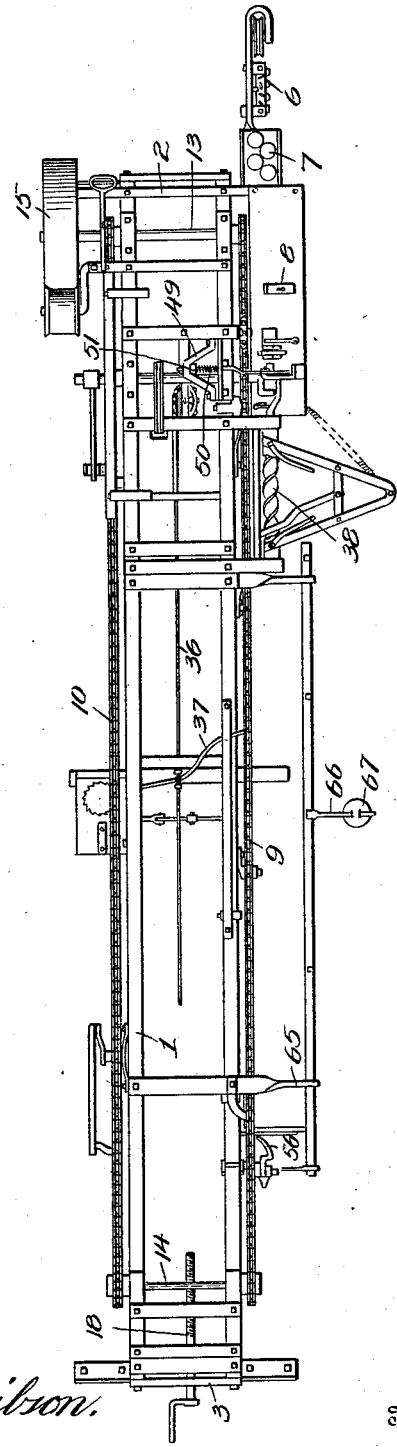
Figure 16:
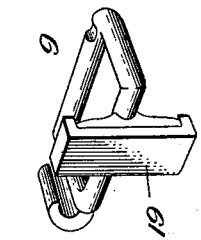
Figure 15:
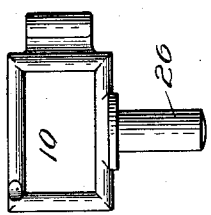
Figure 14:
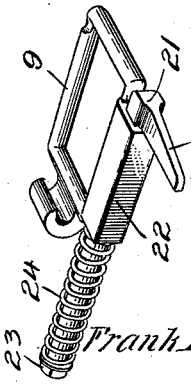
Figure 21:

Figure 1 is a top plan view of a bale tie making machine embodying my invention. Fig. 2 is a side elevation on an enlarged scale of the front end of the machine. Fig. 3 is a similar view of the opposite end of the machine and looking from the same side. Fig. 4 is a side view of the front end of the machine looking toward the opposite side from that shown in Fig. 2. Figs. 5, 6, 7 and 8 are diagrammatical views in perspective, illustrating different stages in the operation of the forming parts in making a tie. Fig. 9 is an enlarged top plan view of the folder, twister, primary kick-off and carrier finger arranged as shown in Fig. 8. Fig. 10 is a sectional elevation of the same taken on the line 10—10 of Fig. 9. Fig. 11 is an enlarged side elevation of the secondary kick-off and carrier finger, illustrating in dotted lines the action of the former in releasing the tie from the latter. Fig. 12 is a top plan view of the same. Fig. 13 is a detail section on the line 13—13 of Fig. 12. Figs. 14 to 20 inclusive are detail views of parts of the machine. Fig. 21 is a view of a completed tie formed by the machine.

Referring to the drawings, 1 designates the frame of the machine, which may be of any suitable construction, and of which 2 is the front and 3 the rear end. The wire 4 from which the ties are successively made leads in practice from a suitable reel or spool to the end 2, at which point it passes under and around a guide pulley 5 and through suitable tension devices 6 and 7 and a guide 8 to the forming devices, hereinafter described.

Extending longitudinally of the frame and in parallel relation to each other are horizontally disposed endless sprocket chains or belts 9 and 10 which pass around sprocket wheels on transverse shafts 13 and 14 arranged respectively at the front and rear ends of the machine. The shaft 13 carries a pulley 15 by which power may be applied thereto from any suitable source to drive said chains, a suitable tightener 16 being provided to guide and hold the driving belt taut. The stretches of the chains run in contact with suitable idlers 17 which guide them in proper relation to the forming devices. Preferably the shaft 14 is mounted in bearings slidable on the frame and adjustable by means of a screw 18, whereby any slackness in the chains may be conveniently taken up.

The upper stretches of the chains 9 and 10 travel in operation toward the end 2 of the machine, while their lower stretches consequently travel toward the end 3. Arranged equidistantly apart on the chain 9 are contact blocks or elements 19—19' which project vertically above and below the links to which they are attached, and also arranged equidistantly apart on said chain are travelers or carrier fingers 20—20' which extend laterally therefrom. Each of said fingers is carried by an angular stem 21 slidable in a guide 22 carried by the adjacent links in a direction longitudinally of the chain, said stem having a cylindrical portion provided with a nut and washer 23 and surrounded by a coiled spring 24 disposed between the washer and the adjacent end of the guide. By this construction the finger is yieldingly mounted for a cushioning action, as hereinafter described.

The chain 10 is provided with two sets of contact pins or projections 25—26 and 25'—26' arranged for operation in pairs at points equidistantly apart along the length of the chain. The projection 25 extends inwardly and is disposed a determined distance in advance of the projection 26 which extends outwardly, and the projections 25' and 26' are correspondingly arranged with relation to each other. The fingers and contact projections upon the chains effect and control the operation of the forming devices as the chains, which are continuously driven, travel through their orbit of movement, their arrangement being such as to operate the forming devices twice on each orbit of movement of the chains to produce a corresponding number of ties. This number may be increased or diminished by varying the length of the chains and the number of contact projections thereon.

Arranged adjacent the forward end of the frame and in proximity to the chain 9 is an anvil or clamping member 27 composed of spaced plates disposed at right angles to the line of feed of the wire 4 and on which the latter is adapted to rest in the preliminary portion of the operation of forming a tie. Mounted for transverse pivotal movement in a vertical plane between the plates of the anvil is a coöperating "throw-up" and retaining device embodying a hooked throw-up and retaining finger 28 and a depending arm 29, said finger being movable in one direction to throw the wire up against the anvil for coöperation with the folder and twister, hereinafter described, and movable in the reverse direction to free the wire for lateral and longitudinal movements and to retain it in position for the subsequent folding and twisting operations. This throw-up and retaining device is normally held in the retaining positions shown in Figs. 6 and 7 by a spring 29' connected with the movable actuating arm 30 of a cutting device comprising pivoted relatively fixed and movable shear blades 31 and 32, the former carried by said arm, which latter is connected with one end of a short sprocket chain section 33 passing over an idle guide sprocket 34. The arm 29 is attached to said chain 33 by a flexible connection 35, and the opposite end of said chain is attached to a cord or wire 36 extending longitudinally of the machine and coupled to a transversely extending pivoted operating lever 37 lying in the path of movement of the contacts 19—19'.

Arranged in rear of the clamping device above described is a wire twisting device comprising a spiral bladed shaft 38 extending longitudinally of the frame and mounted for revoluble movement thereon, the forward end of said shaft being provided with a transversely arranged twisting finger 39 normally disposed between the clamping device and cutter and beneath which the free end of the wire 4 extends. As shown, the finger 39 is provided at one side with a longitudinal groove or recess 39ª extending to and through its free end. A pivoted actuating arm or device 40 is provided to travel along said spiral bladed shaft to revolve the same in reverse directions, the arrangement being such that the finger 39 will be disposed in its stated normal position at each limit of movement of said arm 40. The free end of the arm 40 is provided with a T-shaped vertical projection 41 arranged to be engaged by the contacts 19—19' as they pass said arm on the upper and lower stretches of the chain 9.

At the outset of the operation of forming a tie the free end of the wire 4 extends rearwardly over the anvil and under the finger 39 and between the blades of the cutter, and a device is provided for folding the portion of the wire extending rearwardly beyond the anvil over the top of the twisting finger and in contact with the anvil, to provide a loop at the forward end of the wire which is completed or closed by the action of the twister. This device comprises a finger 42 arranged to extend normally under the wire between the twisting finger and cutter and mounted upon one end of a transverse rock shaft 43 carrying at its opposite end a trip lug 44 and a detent arm 45, said lug and arm being arranged for operation and control by the contact projections upon the chain 10. On said shaft is a pulley 42' from which depends a cord 43' or the like carrying a weight 44', whereby the folder is held in normal position and retracted after operation.

The forming mechanism at the forward end of the frame is completed by the provision of a kick-off or releasing device for freeing the looped portion of the wire from the twisting finger, said device comprising a bell-crank lever 46 provided upon one of its arms with a kick-off finger 47 and having its opposite or upper arm pivoted to the adjacent end of a transversely arranged operating bar 48 slidable in guide members 49 on the frame and normally retained in position to hold the kick-off finger retracted by a spring 50, whose resistance may be regulated by a tensioning nut 51. The arm 48 carries a transversely arranged contact shoe or cam 52 adapted to be engaged by the contact members 19—19' to slide said bar toward the adjacent side of the machine, thus moving the finger 47 inwardly to slide the looped portion of the wire off the twisting finger. The forming mechanism proper is completed by a secondary or final kick-off or releasing device 54 disposed near the rear end of the machine adjacent the chain 9. This device is in the form of a bell-crank lever provided at one end with a trip finger 55 adapted to be engaged by the stems of the travelers or carriers 20—20' and provided at its opposite end with a releasing finger 56 movable by the swinging motion of said lever across the path of the traveler to engage and free the formed tie therefrom, the tie sliding off said finger 56 and the lever returning by gravity to normal position after operation into contact with a supporting roller or stud 57. A pressure spring 58 is provided to guide and retain the adjacent portion of the lower stretch of the chain 9 in position during the operation of the kick-off, which is returned to normal position by a spring connection 59.

The ties as they are formed drop successively into a partially circular receiver 60, the lower edge of which is inturned and normally bears against a series of bars 61, depending from the frame, said bars having at their lower ends supporting hooks 62 to receive and hold a stack of a determined number of ties dumped from said receiver. The receiver is carried by rods 63 depending from a rock shaft 64 suitably journaled in bearings 65 at the adjacent side of the machine. The receiver is inclined so as to tilt outwardly under the pressure or weight of a determined number of ties, which are received by the hooks 62 and may then be bound into a bundle. The shaft 64 carries an outwardly extending arm 66 on which is arranged an adjustable counter-weight 67 which resists the dumping movement of the receptacle and allows the same to tilt outward only when an established number of ties are contained therein, the adjustability of the weight adapting the receiver for an effective sensitiveness of operation. For the purpose of warning the attendant each time a stack of ties is dumped, the shaft 64 is provided with a contact 68 movable by the movement of said shaft into engagement with another contact 69 of an electric circuit 70 to close said circuit, in which is arranged an alarm bell or device 71 which sounds each time the circuit is closed. An evener 72 is arranged adjacent one end of the receiver 60 and is mounted to vibrate toward and from the same on a rock shaft 73 so as to engage the ends of any ties which may project and force the same into the receiver to keep the ends of the stack level, whereby the operation of forming them into a bundle will be facilitated. A lever 74 is connected with the shaft and coupled by a link 75 to a crank 76 on a sprocket wheel 77 driven by contact with the chain 9, whereby the evener is continuously operated.

Fig. 5 shows the parts of the mechanism as arranged at the outset of the operation of forming a tie, from which it will be seen that the end of the wire 4 extends over the anvil, under the grooved finger of the twister and over the finger of the folding device, and that the contact projections 19, 25 and 26 are moving forwardly on the upper stretches of the chains to throw the parts into operation.

The contact 25 first engages the trip arm 44 of the folder, thus throwing the detent arm 45 upwardly to the position shown in Fig. 6, whereby said arm 45 is brought into position to be engaged by the contact projection 26, thus throwing the folder forward a quarter revolution, causing the finger 42 to bend or fold the free end of the wire over the twisting finger 39 and into contact with the anvil, against which the end of the wire is held by said finger 42, doubling the wire for the production of the loop. The folder is held in this position during the operation of the twister, which is now brought into action, by the sliding of the projection 26 along the upper surface of the arm 45, as shown in Fig. 6. While the wire is so held the contact projection 19, which moves forwardly during the folding operation from the position shown in Fig. 5, engages the actuating arm 40 and swings the same forwardly, such arm running along the spiral shank of the twister and imparting a rotary motion thereto, whereby the finger 39 in turning forms a twist in the wire, thus closing the loop.

At this stage the contact projection 26 rides off the arm 45, thereby releasing the folder and permitting it to be returned to normal position by the action of the weight 44'. At the same time the projection 19, in moving forwardly, engages the cam member 52 of the kick-off, whereby the latter is actuated and its finger 47 caused to force the looped end of the wire out of engagement with the twisting finger and off the top of the anvil into the space between the inner side of the same and the hooked retaining finger 28. The contact 19 is preceded in its movement by the carrier finger 20, which now moves rearwardly on the descending stretch of the chain and engages the groove or recess 39ª in the finger 39, by which it is momentarily held from movement as the chain stretch advances, which action is permitted by the sliding engagement of the stem 21 in the guide 22 and the spring 24. While the finger 20 is thus held momentarily from movement the kick-off operates as described to force the looped end of the wire off the finger 39 onto the finger 20, at which time the spring 24 is almost fully tensioned and the relative motion between the chain and finger 20 ceases, the chain pulling upon said finger 20 and causing it to slide off the finger 39, which action is permitted by and during the final tensioning of said spring. The finger 20 is then brought by said spring back to normal position and carries the wire, which runs in guided connection with and over the finger 28, toward the rear of the machine until said finger 20 engages the final kick-off 54, which releases the looped end of the wire from said finger. Just prior to the time the kick-off engages and removes the looped end of the wire from the carrier finger, the projection 19 engages the lever 37 and moves the same rearwardly, thus operating the cutter to sever the wire at a determined distance from the loop and complete the formation of the tie at the instant the said final kick-off comes into action.

Before operating the lever 37 the projection 19, moving rearwardly on the lower stretch of the chain 9, first engages the lower portion of the T-shaped end 41 of the actuating device 40, thus returning said actuating device to its normal position, which return reversely rotates the twister without affecting the wire. Upon the passage of the contact 19 beyond the lever 37, the spring 29' returns the blades of the cutter to normal or open position. The rearward movement of the lever 37 also causes the movement of the arm 29 to actuate the hooked finger 28, which moves the free end of the wire up again to the top of the anvil and into the bifurcation of the twisting finger 39, said finger 28 being returned to normal position with the movable blade of the cutter by the spring 29' after thus disposing the free end of the wire in position for the formation of the succeeding tie, the operation of the parts on the next half of the orbit of movement of the chains being effected by the contact projections 19', 25' and 26' and the carrier finger 20', as will be readily understood. As each formed tie is released by the final kick-off it drops into the receiver, which dumps the ties after a certain number are made in the manner hereinbefore described.

The operation of the parts throughout will be readily understood by reference to Figs. 5 to 8, inclusive, and it will be seen that my invention provides a simple construction of machine which is adapted to rapidly and successively form bale ties of the character described from a continuous wire, enabling the ties to be economically manufactured.

Having thus described the invention, I claim:—

1. In a bale-tie-making machine, the combination of a pair of parallel endless travelers, an anvil arranged adjacent to one of said travelers, a wire-retaining device for holding the wire and moving it toward and from the anvil, a twister arranged in advance of the anvil and including a twisting finger beneath which the end of the wire leading from the anvil extends, a cutter arranged in advance of the twisting finger, a folder normally disposed between the cutter and twisting finger and operative to fold the free end of the wire over said finger and down upon the anvil to form a loop in the wire, a carrier upon said traveler for feeding the wire forward, a kick-off for releasing the looped end of the wire from the twisting finger and engaging it with said carrier, means for normally holding the wire-retaining device and kick-off retracted, means upon said traveler for successively actuating the twister, retracting the retaining device and projecting the kick-off, and means carried by the other traveler for actuating the folder prior to the operation of the twister by the first-mentioned means.

2. In a bale-tie-making machine, the combination of a pair of parallel endless travelers, an anvil, a wire-retaining device associated with the anvil for retaining the end of the wire and moving it toward and from said anvil, a twister arranged in advance of the anvil and including a twisting finger beneath which the end of the wire leading from the anvil extends, a cutter arranged in advance of the twisting finger, a folder normally disposed between the cutter and twisting finger and operative to fold the free end of the wire over said finger and against the anvil to form a loop in the wire, means carried by one of the travelers for actuating said folder and maintaining it in operation during the operation of the twister, means for retracting said folder after actuation, a carrier upon the other traveler for feeding the wire forward, a kick-off for releasing the looped end of the wire from the twisting finger and engaging it with said carrier, means for normally holding the wire-retaining device and kick-off retracted, and means carried by the second-named conveyer for successively actuating the twister, releasing the retaining device, projecting the kick-off to throw the twisted loop into engagement with the carrier, operating the cutter and returning the twister to normal position.

3. In a bale-tie-making machine, the combination of a pair of parallel endless travelers, a wire-clamping and releasing device, a cutter, a twister arranged between the said clamping and releasing device and the cutter, a folder adapted to fold the free end of the wire over the twister and in contact with the clamping and releasing device, a carrier upon one of the travelers adapted to engage the looped end of the wire formed by the folder and twister to feed the wire forward, a kick-off for throwing the loop out of engagement with the twister and into engagement with the carrier, means carried by the other conveyer for operating the folder and maintaining the same in operation during the actuation of the twister, means for returning the folder to normal position, and means carried by the first-named conveyer for successively actuating the twister, kick-off and cutter.

4. In a bale-tie-making machine, the combination of a pair of parallel endless travelers, an anvil, a wire-retaining device associated with the anvil for moving the free end of the wire toward and from said anvil, a twister arranged in advance of the anvil and including a twisting finger, a folder adapted to fold the free end of the wire over said finger and against the anvil to form a loop in the wire, a carrier upon one of the travelers for feeding the wire forward, a kick-off for releasing the wire from the twisting finger and engaging it with said carrier, a cutter for severing the wire, a second kick-off for releasing the looped end of the severed tie from the carrier, means upon said conveyer for successively actuating the twister, primary kick-off, cutter, and secondary kick-off, and means upon the other conveyer for actuating the folder and maintaining it in operation during the operation of the twister.

5. In a bale-tie-making machine, the combination of a pair of endless parallel conveyers, a twister, mechanism for looping the wire about the twister including a folder, a device upon one of the conveyers to engage the closed loop in the wire formed by the folder and twister and to feed the wire forward, a device for shifting the looped end of the wire from the twister into engagement with the first-named device, a cutter for severing the wire, means operated by one of the conveyers for actuating the folder, and means carried by the other conveyer for successively operating the twister, shifting device, and cutter.

6. In a bale-tie-making machine, the combination of a pair of endless parallel conveyers, means including a folder for forming the free end of the wire into a loop, a device for twisting the wire to close the loop, means upon one of the conveyers to engage the looped end of the wire to feed the same forward, means for shifting the looped end of the wire from the twister to said engaging and feeding device, a cutter for severing the fed wire at a distance from the loop, and means upon the conveyers for successively throwing the folding, twisting, shifting and cutting devices into action.

7. In a bale-tie-making machine, the combination of a pair of endless parallel conveyers, means including a folder for forming the free end of the wire into a loop, a device for twisting the wire to close the loop, means upon one of the conveyers to engage the looped end of the wire and feed the wire forward, means for shifting the looped end of the wire from the twister to said engaging and feeding means, a cutter for severing the said wire at a distance from the loop, a second means for shifting the looped end of the wire out of engagement with the engaging and feeding means to free the formed tie, and means upon the conveyers for successively throwing the folding, twisting, first-named shifting means, cutter and second-named shifting means into action.

8. In a bale-tie-making machine, the combination of a pair of endless parallel conveyers, an anvil forming a guide for the free end of the wire, a twister, a folder for coöperation with the anvil to loop the end of the wire about the twister, a kick-off for disengaging the looped end of the wire from the twister, a contact upon one of the conveyers for successively operating the twister and kick-off, means upon the other conveyer for operating the folder prior to the operation of the twister and maintaining said folder in action during the operation of the twister, means upon the first-named conveyer to engage and feed the wire released from the twister by the kick-off, a cutter for severing the wire, and means upon said first-named conveyer for successively operating the twister, kick-off and cutter.

9. In a bale-tie making machine, the combination of a pair of endless parallel conveyers, an anvil forming a guide for the wire, a twister, a folder coöperating with the anvil to loop the end of the wire about the twister, a carrier upon one of the conveyers to engage the looped end of the wire and feed the wire forward, a kick-off for disengaging the wire from the twister and engaging the same with the carrier, a cutter for severing the wire, and devices upon the conveyers for successively operating the folder, twister, kick-off and cutter.

10. In a bale-tie-making machine, the combination of a pair of endless parallel conveyers, an anvil forming a guide for the wire, a twister, a folder coöperating with the anvil to loop the end of the wire about the twister, a carrier upon one of the conveyers to engage the looped end of the wire and feed the wire forward, a kick-off for disengaging the wire from the twister and engaging the same with the carrier, a cutter for severing the wire, means upon the aforesaid conveyer for successively actuating the twister, kick-off and cutter, and means upon the other conveyer for operating the folder prior to the action of the twister.

11. In a bale-tie-making machine, the combination of a pair of endless parallel conveyers, an anvil forming a guide for the wire, a twister, a folder coöperating with the anvil to loop the end of the wire about the twister, a carrier upon one of the conveyers to engage the looped end of the wire and feed the wire forward, a kick-off for disengaging the wire from the twister and engaging the same with the carrier, a cutter for severing the wire, means actuated by the first-named conveyer for operating the twister, kick-off and cutter, and means actuated by the other conveyer for actuating the folder prior to the operation of the twister and maintaining said folder in projected position during the period of operation of the twister.

12. In a bale-tie-making machine, the combination of a pair of endless parallel conveyers, an anvil forming a guide for the wire, a twister including a spiral shaft and a device movable in opposite directions to reversely rotate said shaft, a folder coöperating with the anvil to loop the end of the wire about the twister, a carrier upon one of the conveyers to engage the looped end of the wire and feed the wire forward, a kick-off for disengaging the wire from the twister and engaging the same with the carrier, a cutter for severing the wire, a contact carried by the first-named conveyer for successively actuating the twister operating device, kick-off and cutter and retracting said twister actuating device, a device upon the other conveyer for projecting the folder prior to the operation of the twister, and a second device upon said conveyer for maintaining the folder in operation during the period of operation of the twister.

13. In a bale-tie-making machine, the combination of a pair of endless parallel conveyers, devices controlled by one of the conveyers for twisting a folded portion of the wire to form a closed loop and feeding the wire forward, a folder for folding the end of the wire for the twisting action, said folder comprising a finger, a rock shaft carrying said finger, means associated with the shaft for normally holding the finger retracted, a trip lug on the shaft, a detent arm on the shaft, and devices carried by the other conveyer for successively engaging said lug and arm to rock the shaft and actuate the finger and to maintain said finger in projected position while the wire is being twisted to close the loop.

14. In a bale-tie-making machine, the combination with means for folding the free end of the wire to form a loop, and means for operating the same, of an endless conveyer provided with means for engaging the closed loop and feeding the wire forward, a twisting finger for twisting the wire to close the loop, a spiral shaft carrying said finger, a pivoted arm movable in opposite directions along the shaft to rotate the same in reverse directions, said arm having upwardly and downwardly extending projections, and means carried by said conveyer to engage said projections and impart reverse movements to said arm.

15. In a bale-tie-making machine, a rotary twisting finger having a longitudinal recess, an endless conveyer, a yielding carrier finger on the conveyer movable in said longitudinal recess to engage the looped portion of a wire bale formed by the twister, a kick-off for shifting the loop from the twister on to the carrier finger, and means carried by said conveyer for actuating the twister and kick-off.

16. In a bale-tie-making machine, a rotary twisting finger having a longitudinal recess, an endless chain conveyer having a guide member thereon, a sliding stem movable in said guide member and provided with a carrier finger adapted to move in the longitudinal recess of the twisting finger and engage the looped portion of a bale tie formed thereby, a spring acting upon said stem to permit the same to have a yielding sliding movement, a kick-off for shifting the loop from the twisting finger to the carrier finger, and means carried by said conveyer for actuating the twister and kick-off.

17. In a bale-tie-making machine, an endless conveyer, a rotary twisting finger provided with a recess, a yieldably mounted carrier finger on the conveyer adapted to engage said recess and slide past said finger, a kick-off arranged to engage a looped portion of a wire formed by the twisting finger and to slide the same therefrom on to the carrier finger when said fingers are in engaging relation, and means carried by said conveyer for actuating the twisting finger and kick-off.

18. In a bale-tie-making machine, an endless conveyer, a rotary twisting finger, a yieldably mounted carrier finger on the conveyer adapted to contact with said twisting finger, a pivotally mounted kick-off arranged to engage a looped portion of a wire formed by the twisting finger and to slide the same therefrom onto the carrier finger when said fingers are in engaging relation, an automatically retracted operating device for actuating the kick-off, and a projection upon the conveyer to actuate the twisting finger and the aforesaid operating device.

19. In a bale-tie-making machine, an endless conveyer, a rotary twisting finger, a yieldably mounted carrier finger on the conveyer adapted to contact with said twisting finger, a bell-crank lever having a kick-off finger arranged to engage a looped portion of a wire formed by the twisting finger and to slide the same therefrom on to the carrier finger when said fingers are in engaging relation, an automatically retracted operating device for actuating said bell-crank lever, and a projection upon the conveyer to actuate the twisting finger and the aforesaid operating device.

20. In a bale-tie-making machine, an endless conveyer, a rotary twisting finger, a yieldably mounted carrier finger on the conveyer adapted to contact with said twisting finger, a bell-crank lever having a kick-off finger arranged to engage a looped portion of a wire formed by the twisting finger and to transfer the same therefrom to the carrier finger when said fingers are in engaging relation, an automatically retracted actuating device connected with the bell-crank lever and having a cam portion, and a projection upon the conveyer to actuate the twisting finger and engage said cam to operate the bell-crank lever.

21. In a bale-tie-making machine, an endless conveyer, a rotary twisting finger, a yieldably mounted carrier finger on the conveyer adapted to contact with said twisting finger, a bell-crank lever having one of its arms provided with a kick-off finger arranged to engage a looped portion of the wire formed by the twisting finger and to transfer the same therefrom to the carrier finger when said fingers are in engaging relation, a sliding operating device connected with the other arm of the bell-crank lever, a spring acting on said device to normally hold the kick-off finger retracted, a projection on the conveyer for operating the twisting finger, and a cam on said sliding operating device adapted to be engaged by said projection to transfer motion to the kick-off lever.

22. In a bale-tie-making machine, a bifurcated anvil forming a support for the free end of the wire, a hooked retaining and throw-up finger pivoted to and movable in the bifurcated anvil, a twisting finger, a folder operative to fold the free end of the wire about the finger and against the anvil, means for projecting and retracting said retaining and throw-off finger, and means for successively operating the folder and twisting finger.

23. In a bale-tie-making machine, a rotary twisting finger, means for folding the free end of the wire about the finger and clamping the extremity of the wire while the finger is twisting the fold to form a closed loop, a traveler provided with means to engage the loop and feed the wire forward, means operated by the traveler for actuating the folder and twisting finger, a cutter provided with relatively movable blades through which the wire is drawn on its feed motion, a pivoted operating lever adapted to be actuated by the traveler, and a flexible connection between said lever and one of the blades of the cutter.

24. In a bale-tie-making machine, an endless conveyer, means for forming a loop upon one end of a continuous wire, a carrier finger on the conveyer adapted to engage the loop and feed the wire forward, a bell-crank kick-off embodying a trip finger adapted to be engaged by the carrier finger and a releasing finger adapted to be projected by the ensuing movement of the kick-off to engage and release the looped end of the wire from said carrier finger, and means for retracting said kick-off after actuation.

25. In a bale-tie-making machine, the combination of a pair of endless parallel conveyers, an anvil, a rotary twisting finger, a folder controlled in operation by one of said conveyers for folding the free end of the wire about the twisting finger and against the anvil, a kick-off device for releasing the looped end of the wire from the twister, a projection upon the other conveyer adapted to engage the looped end of the wire freed from the twister and to feed said wire forwardly, a cutter for severing the wire at a predetermined distance from the loop, and means carried by the second-named conveyer for operating the twisting fingers, kick-off device and cutter.

In testimony whereof I affix my signature in presence of two witnesses.

FRANK LENARD WEBSTER.

Witnesses:
H. M. REID,
O. B. LOVELAND.